March 10, 1936.  A. H. COHN  2,033,113
ORNAMENTAL PRODUCT
Filed May 16, 1935   3 Sheets-Sheet 1
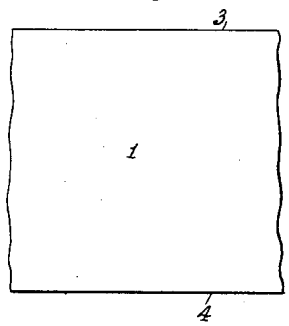
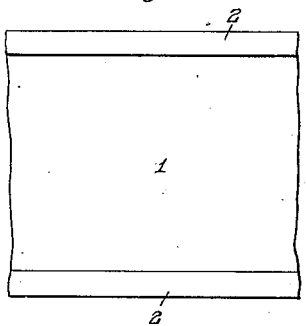
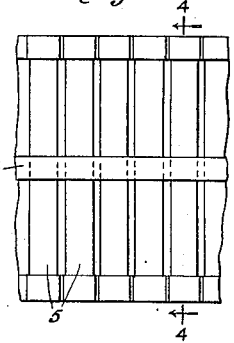
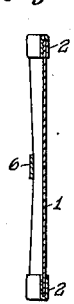
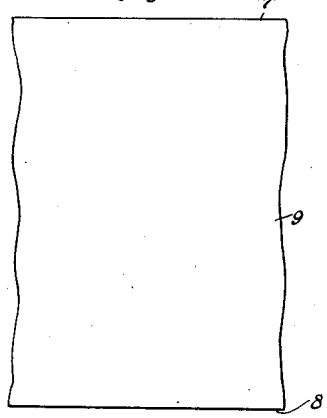
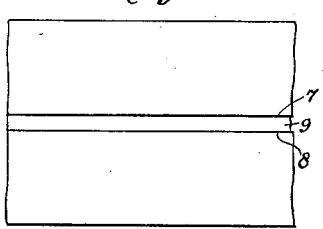
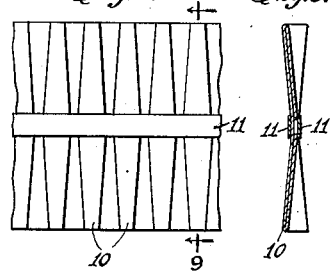
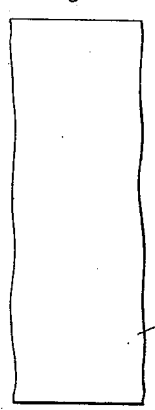
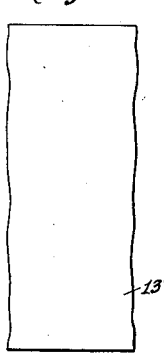
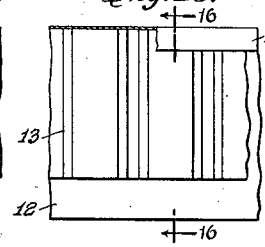
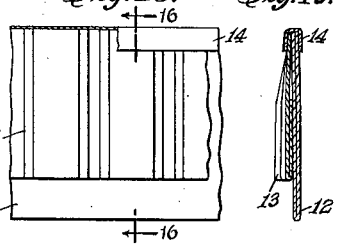
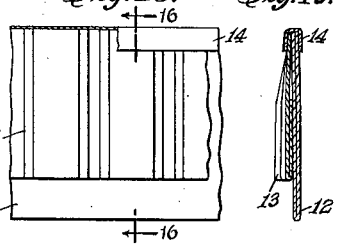
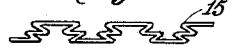
INVENTOR.
Adolph H. Cohn
BY Wm. J. Pritchard
ATTORNEY.

March 10, 1936.  A. H. COHN  2,033,113
ORNAMENTAL PRODUCT
Filed May 16, 1935  3 Sheets-Sheet 2
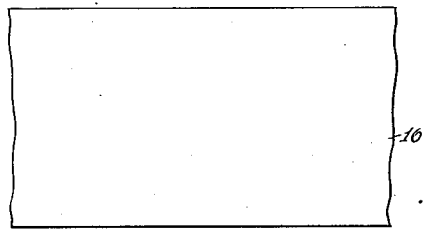
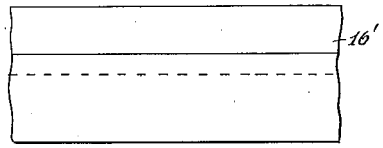
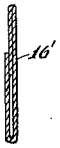
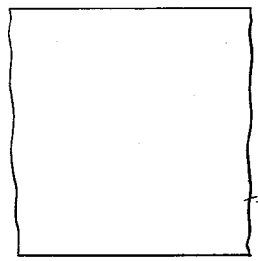
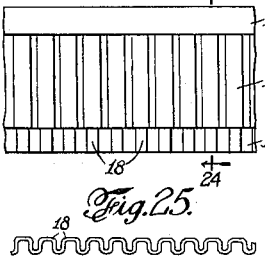
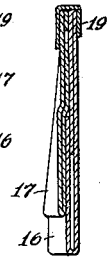
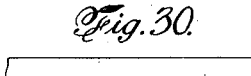
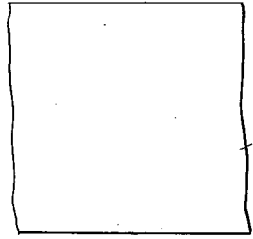
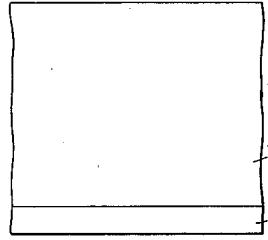
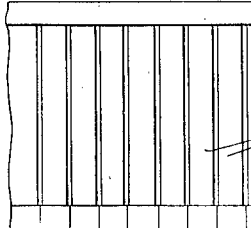
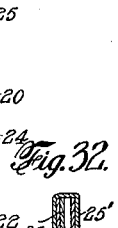
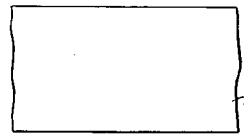
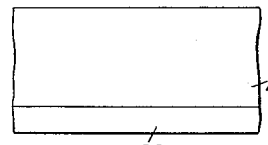
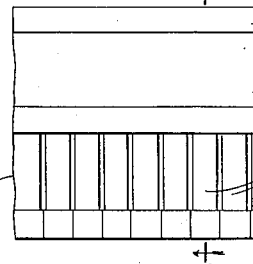
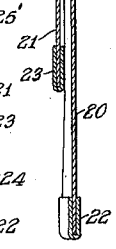
INVENTOR.
Adolph H. Cohn
ATTORNEY.

March 10, 1936.  A. H. COHN  2,033,113
ORNAMENTAL PRODUCT
Filed May 16, 1935  3 Sheets-Sheet 3
Fig.34. Fig.35. Fig.38. Fig.39.
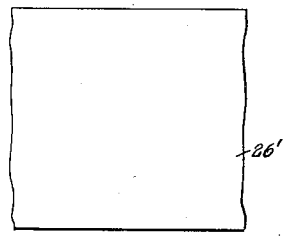
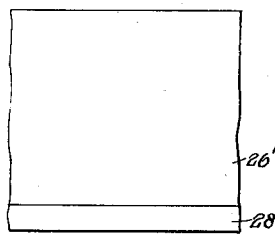
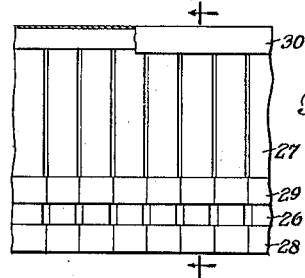
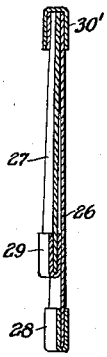
Fig.36. Fig.37. Fig.40.
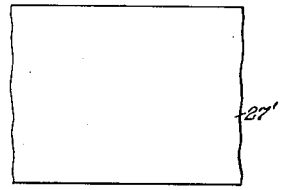
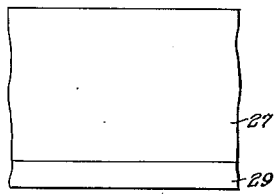
Fig.41. Fig.42. Fig.43. Fig.44.
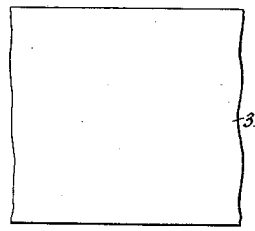
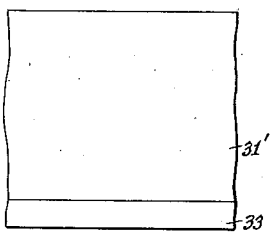
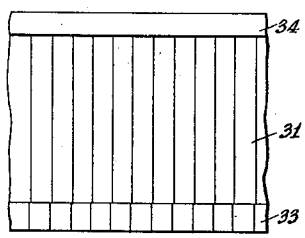
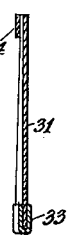
Fig.45. Fig.46. Fig.47. Fig.48.
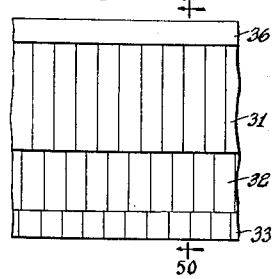
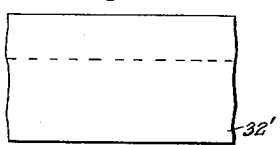
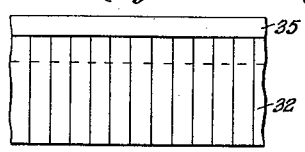
Fig.49. Fig.50. Fig.51.
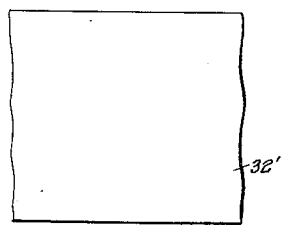
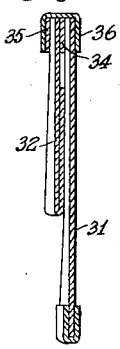
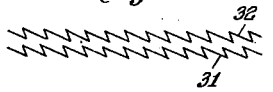
Adolph H. Cohn INVENTOR.
BY Wm. S. Pritchard
ATTORNEY.

Patented Mar. 10, 1936

2,033,113

UNITED STATES PATENT OFFICE 2,033,113

ORNAMENTAL PRODUCT

Adolph H. Cohn, New York, N. Y., assignor to Du-Tone Ribbon Corp., New York, N. Y., a corporation of New York Application May 16, 1935, Serial No. 21,754

10 Claims. (Cl. 41—10)

This invention relates to an ornamental article of manufacture. More particularly, it relates to an ornamental and artistic edging for shelving.

The nature of the invention and the objects will become apparent from the following description, appended claims and accompanying drawings forming a part of this specification and wherein several illustrative embodiments of the invention are illustrated and in which:

Figures 1 and 2 illustrate the material at different stages in the process of producing the edging for shelving shown in Figure 3, which is a front elevation of the edging.

Figure 4 is a section taken on the line 4—4 of Figure 3.

Figure 5 is a bottom view of the shelf edging shown in Figure 3.

Figures 6 and 7 illustrate the material at different stages in the process of producing the shelf edging illustrated in Figure 8, which is a front elevation.

Figure 9 is a section taken on the line 9—9 of Figure 8.

Figure 10 is a bottom view of the shelf edging shown in Figure 9.

Figures 11 to 14 illustrate the materials at different stages in the process of making the edging illustrated in Figure 15, which is a front elevation.

Figure 16 is a section taken on the line 16—16 of Figure 15.

Figure 17 is a bottom view of the edging shown in Figure 15.

Figures 18 to 22 illustrate the material at different stages in the process of producing the edging illustrated in Figure 23, which is a front elevation.

Figure 24 is a section taken on the line 24—24 of Figure 23.

Figure 25 is a bottom view of the edging shown in Figure 23.

Figures 26 to 30 illustrate the material at different stages in the process of making the edging shown in Figure 31, which is a front elevation.

Figure 32 is a section taken on the line 32—32 of Figure 31.

Figure 33 is a bottom view of the edging shown in Figure 31.

Figures 34 to 37 illustrate the material at different stages in the process of making the edging shown in Figure 38, which is a front elevation.

Figure 39 is a section taken on the line 39—39 of Figure 38.

Figure 40 is a bottom view of the edging shown in Figure 38.

Figures 41 to 48 illustrate the materials at different steps in the process of making the edging shown in Figure 49, which is a front elevation.

Figure 50 is a section taken on the line 50—50 of Figure 49.

Figure 51 is a bottom view of Figure 49.

In accordance with the principles of this invention, a strip of a non-fibrous material is pleated, i. e. corrugated, fluted, box-pleated, side-pleated, bias-pleated, pattern-pleated, combination-pleated, shirred, to form a highly ornamental and decorative material. Usually, means are provided to maintain the pleats in permanent position. The single pleated material, as will hereafter appear, can be used alone for edging for shelving.

In other embodiments of the invention the edging for shelving comprises a body member, which may be pleated or plain, in conjunction and in combination with a flounce-like member which also may be pleated or plain as desired. When both the body member and the flounce-like member are pleated, both may be pleated simultaneously or each may be separately pleated and later assembled. When the latter embodiment is utilized, the body member and flounce-like element may each be given a different type of pleating, whereby an enhanced artistic and decorative effect is produced.

A strip of a non-fibrous material from which the edging is made, though rather strong and rugged, is relatively weak at its cut edges. In order to avoid this disadvantage and produce an edging for shelving which is strong and rugged, the invention contemplates protecting the normally free cut edge or edges. This is effected by folding the cut edge, which is to constitute a free end in the product, on itself or alternatively adhesively securing said cut edge between the laminæ of a folded-over edge strip.

Non-fibrous material of the type of which the edging for shelving of the instant invention is made cannot be successfully stitched. Unless suitable precautions are taken, the thread passing through the holes made by the needle has a tendency to rip the body of the material. Accordingly, the instant invention contemplates, in its preferred embodiment, the use of adhesives in the assembling of that embodiment of the invention which utilizes two separate portions of material.

The assembly of the body member and flounce-like element is accomplished by adhesively securing the upper edge portions of the two superimposed materials by a folded-over edge strip which is similar to the folded-over edge strips previously mentioned.

Appropriately dimensioned strips of regenerated cellulose are the preferred materials from which the shelving is made. It is, of course, to be understood that strips of other non-fibrous material, such as cellulose acetate, nitrocellulose, cellulose ether, "Plioform", albuminous substances, etc. may be used. Also combinations of the previously mentioned materials may be used.

More attractive appearing products are secured when the non-fibrous material is opaque and/or decorated, and, therefore, such materials are used in the preferred forms. The opaquing can be secured by incorporating an opaquing agent in the solution from which the non-fibrous material is produced. Alternatively, the transparent non-fibrous material may be opaqued by coating with a suitable coating composition, such as a varnish or lacquer. Usually the coating composition is of the type which deposits a waterproof coating. When a material simulating metal foil is desired, the transparent material may be metallized as is well known in the art. The coated surfaces may be highly lustrous and brilliant. When the coating is applied to only one surface, the surface opposite to the coated surface has a dull mat appearance which is highly desirable in some cases. The non-fibrous material may be decorated, such as is obtained by printing the same with various designs and/or indicia. The non-fibrous material may, for example, be printed with designs, whereby the material will simulate lace, chintz, etc.

The opaque non-fibrous material may also be moisture-proof.

In the preferred embodiments of the invention, the different component parts are made of different and contrasting colors and/or decorations. For example, the body-member, the flounce-like element, the folded-over edge strips, and the retaining strips may each be made of the same color and/or decoration or of differently contrasting colored and/or decorated materials.

The adhesives used in the securing or bonding of the various elements above referred to depend to a great extent on the nature of the non-fibrous material, the coating thereon, etc. In the preferred form of the invention, the adhesive is of the thermoplastic type. Any of the known thermoplastic adhesives can be used. I have found that the thermoplastic adhesive sold by "Du Pont" as Thermoplastic cement No. 4620, Serial No. 56–1346, is admirably suited for the purpose.

It is apparent that many different specific embodiments of the invention can be made. In the drawings, Figures 3, 8, 15, 23, 31, 38 and 49 illustrate several specific illustrative forms of the invention.

In order to more fully explain the invention, it will be described in connection with the drawings wherein like reference numerals designate like parts.

For the sake of brevity, the invention will hereafter be more particularly described as being made from opaqued regenerated cellulose. It is to be understood that the disclosure herein preceding also applies.

Referring now to Figures 1 to 5 inclusive wherein there is disclosed one embodiment of the invention, the reference numeral 1 designates a strip or tape of opaque and colored regenerated cellulose of a width determined by the width of the final product. In the process of producing the edging illustrated in Figures 3 to 5 inclusive, a strip of regenerated cellulose 2 is folded over and secured to the top and bottom edges 3 and 4 respectively, and thereafter the material is pleated in any well-known manner. Though in the form illustrated in Figures 3 to 5 inclusive the pleats 5 are of the well-known box type, it is to be understood that any type of pleating may be produced.

During the pleating operation the pleats 5 are held in place by a suitable mechanism. In order to permanently retain the pleats in place in the finished article, a strip of regenerated cellulose 6 is secured thereto. In the form illustrated in Figure 3, the retaining strip 6 is shown as being in the approximate center of the edging, though obviously it may be at any other place. In the preferred embodiment of this form, the retaining strip 6 is applied during the pleating operation. If desired, it may be applied after the pleating operation.

The folded-over edge strips 2, which are of any desired width, may be applied and secured to the body member 1 in various ways. The edges of the body member 1 may be coated with a thermoplastic adhesive. Thereafter the edge strips 2 may be folded over the edges and passed through any suitable means, such as heated rollers, whereby the thermoplastic adhesive is energized and the materials are united. Alternately, the thermoplastic adhesive may be on the strips which constitute the edge strips 2. If desired, the edge strip may be folded longitudinally on itself and the edge of the body member caused to be positioned between the laminae thereof.

The pleat-retaining strip 6, which is of any desired width, is thinly coated with a thermoplastic adhesive on one side thereof and it too is applied by passage between heated rollers or other appropriate means. If desired, the adhesive may be first energized and, while in such condition, secured to the pleated material.

Another embodiment of the invention is illustrated in Figures 8 to 10 inclusive. To make this form, the top and bottom edges 7 and 8 respectively of a strip of regenerated cellulose 9 are folded over on to the rear surface of the strip 9 to form a material having the approximate form shown in Figure 7 of the drawings. This material is then pleated to produce, for example, corrugations 10, by passing the material illustrated in Figure 7 through one of the well-known corrugated or fluting machines.

During the corrugating operation, the corrugations are held in place in a suitable manner and thereafter, or simultaneously with the corrugating operation, a retaining strip 11 is applied to permanently retain the corrugations in the product. In the preferred embodiment of this procedure, the retaining strip 11 is applied to both the front and rear portions of the corrugated material and in an operation combined with the corrugating step.

It is to be understood, that, though the material is shown in Figure 7 as being folded over to approximately cover the entire rear surface, the invention is not restricted thereto. The folded-over portions may be of any desired width. They may be relatively narrow or indeed overlap.

Another embodiment of the invention is illustrated in Figures 15 to 17 inclusive. In this form the edging comprises a body member 12 and a flounce-like element 13, adhesively secured at the top edge by a folded-over strip 14 which is bonded to the material.

To produce the material illustrated in Figures 15 to 17 inclusive, the bottom edge of a strip of regenerated cellulose 12', which is to constitute the body member 12, is folded over on to itself to produce the form illustrated in Figure 12. If desired, the top edge may also be folded over on to the body member. The bottom edge, and preferably also the top edge, of a strip of regenerated cellulose material 13', which is to form the flounce-like element 13 in the final product, is folded over on itself to produce, for example, the material having the form illustrated in Figure 14. The material, which is to constitute the flounce-like element 13, is then pleated. In the form illustrated in Figures 15 and 17, the pleating 15 is of the combination type. If desired, a retaining strip may be applied to the flounce-like element 13 adjacent the top edge thereof and preferably on the under side thereof. The pleated flounce-like member 13 is then superposed on the body member 12 in such a manner that the top edges thereof are in substantially the same line. While in this position the strip 14 is adhesively secured thereto. The strip 14 is similar to the edge strip 2 in Figures 2 to 4 and may be applied in the same manner as said strip 2 is applied.

It is to be understood that, if desired, both the top and bottom edges of the strip 12' may be folded over. With respect to the flounce-like member, in many instances it is sufficient to merely back-fold the lower edge. Also, it is to be understood that the edge folds in both members 12 and 13 need not be of any precise dimensions. The back-folded portions may be of any desired width.

Still another embodiment of the invention is illustrated in Figures 23 to 25 inclusive. In this embodiment of the invention both the body member 16 and the flounce-like member 17 are provided with corrugations 18 and the two members secured together at the top edges thereof by a folded-over strip 19. To produce this material a strip of regenerated cellulose 16', which is to constitute the body member 16, is back-folded at the top and bottom edges to produce the material illustrated in Figure 19. A second strip of regenerated cellulose 17', which is to constitute the flounce-like element 17, is similarly back-folded to produce the material illustrated in Figure 22. The two materials 16' and 17' are then superposed on one another, with the top edges thereof in alignment, and passed through a pleating machine, whereby the two materials are simultaneously pleated. In the form illustrated in Figures 23 and 25, the pleating is in the form of corrugations 18. During the pleating operation precautions are taken to maintain the pleats in position. During the pleating operation, or subsequent thereto, the folded-over strip 19 is applied. If desired, in the foregoing embodiment only the bottom edges of the body member and flounce-like member may be folded over.

Another embodiment of the invention is illustrated in Figures 31 to 33 inclusive. In this embodiment the body member 20 is pleated and the flounce-like element 21 is plain. Also, in this embodiment, the lower edges of both members are provided with folded-over edge strips 22 and 23.

To produce this material, the lower edge of a tape of regenerated cellulose 20' is provided with the folded-over edge strip 22 in the manner heretofore previously described. This material is then pleated, the pleats 24 being, for example, of the box type. In order to retain the pleats in position, there is applied a retaining strip 25 at the top and on the front of the pleated body member 20. To the lower edge of a second strip of regenerated cellulose 21', which is to constitute the flounce-like element, there is secured the folded-over edge strip 23 in the manner previously described. The flounce-like member is then superposed on the pleated body member with their top edges in alignment and the two are joined together by means of the folded-over strip 25' in the manner previously described.

Still another embodiment of the invention is illustrated in Figures 38 to 40. In this embodiment of the invention both the body member 26 and the flounce-like member 27 have folded-over edge strips 28, 29 on the free edges thereof and are simultaneously pleated. In this embodiment of the invention a strip of regenerated cellulose 26', which is to constitute the body member 26, is provided with the folded-over edge strip 28, as has been previously explained. The strip of regenerated cellulose 27', which is to constitute the flounce-like element 27, is in the same manner provided with the folded-over edge strip 29. The two materials are then superposed with the top edges thereof in alignment and passed through a pleating machine, whereby they are simultaneously pleated. In the form shown, the pleating 30 is of the box type. Either during or subsequent to the pleating operation, a folded-over strip 30' is adhesively secured to the pleated material.

Still another embodiment of the invention is shown in Figures 49–51 inclusive. In this embodiment of the invention, the body member 31 and the flounce-like member 32 are separately pleated and later assembled. To produce this material a tape of regenerated cellulose 31', which is to form the body member 31, is provided with a folded-over edge strip 33 at the bottom edge thereof in the same manner as has been described in connection with one or more of the preceding modifications. This material is then pleated. Either during or subsequent to the pleating operation, a retaining strip 34 is secured adjacent the top edge of the material. A second tape of regenerated cellulose 32', which is to constitute the flounce-like element 32, is back-folded on itself at the lower edge to produce the material illustrated in Figure 46. This material is pleated and a retaining strip 35 is securely bonded to the pleated material at the top edge thereof either during or after the pleating operation. The two elements are then superposed and a folded-over strip 36 is secured thereto, as has been described previously in connection with the other embodiments.

Though the preferred form does not contemplate stitching, nevertheless, by virtue of the folded-over edge strips at the top of the shelving, these materials can be stitched. They may be stitched during the process and prior to the application of the strip.

From the foregoing description of the several embodiments of the invention, it is apparent that the specific embodiments of the invention may take many forms.

The edging for shelving produced by the instant invention is highly decorative. It is strong and rugged. It is economical. In many of the embodiments the product has a high luster and sheen. If dust accumulates thereon or it becomes dirty, it may readily be cleaned by wiping with a damp or dry cloth.

Since it is obvious that various changes may be made in the specific details hereinabove set forth, this invention is not restricted thereto except as set forth in the appended claims.

I claim:

1. An edging for shelving comprising a pleated non-fibrous material and means adhesively secured thereto to retain the pleats in place.

2. An edging for shelving comprising a pleated non-fibrous material, a folded-over strip adhesively secured and bonded to at least the bottom edge of said material, and means adhesively secured thereto to retain the pleats in place.

3. An edging for shelving comprising a pleated non-fibrous material having at least its original bottom edge folded over on itself, and means adhesively secured thereto to retain the pleats in place.

4. An edging for shelving comprising a non-fibrous body member, a non-fibrous flounce-like member superposed on said body member, and a folded-over strip adhesively bonded to said members at the top edges thereof.

5. An edging for shelving comprising a pleated non-fibrous body member, a non-fibrous flounce-like member superposed on said body member, and a folded-over strip adhesively bonded to said members at the top edges thereof.

6. An edging for shelving comprising a non-fibrous body member, a pleated non-fibrous flounce-like member superposed on said body member, and a folded-over strip adhesively bonded to said members at the top edges thereof.

7. An edging for shelving comprising a non-fibrous body member having a folded-over strip adhesively secured to the bottom edge thereof, a non-fibrous flounce-like member superposed on said body member, and a folded-over strip adhesively bonded to said members at the top edges thereof.

8. An edging for shelving comprising a non-fibrous body member having its original bottom edge folded over on itself, a non-fibrous flounce-like member superposed on said body member, and a folded-over strip adhesively bonded to said members at the top edges thereof.

9. An edging for shelving comprising a non-fibrous body member, a non-fibrous flounce-like member having a folded-over strip secured to the bottom edge thereof, said flounce-like member being superposed on said body member, and a folded-over strip adhesively bonded to said members at the top edges thereof.

10. An edging for shelving comprising a non-fibrous body member, a non-fibrous flounce-like member having its original bottom edge folded over on itself, said flounce-like member being superposed on said body member, and a folded-over strip adhesively bonded to said members at the top edges thereof.

ADOLPH H. COHN.